United States Patent
Bath-Ternstrand

[11] Patent Number: 5,865,596
[45] Date of Patent: Feb. 2, 1999

[54] SEPARATING AND PICKING OUT DEVICE

[75] Inventor: Benny Bath-Ternstrand, Osterbymo, Sweden

[73] Assignee: Sten Wallsten Nikom AB, Eksjo, Sweden

[21] Appl. No.: 749,163

[22] Filed: Nov. 14, 1996

[30] Foreign Application Priority Data

Nov. 16, 1995 [SE] Sweden ................................ 9504084

[51] Int. Cl.[6] .................................................. B66F 11/00
[52] U.S. Cl. .................................. 414/746.4; 414/745.9; 414/745.1; 198/468.8
[58] Field of Search ............................ 414/745.1, 745.9, 414/746.4, 22.62; 198/468.8

[56] References Cited

U.S. PATENT DOCUMENTS

| | | | |
|---|---|---|---|
| 2,426,095 | 8/1947 | Hecker | 414/746.4 |
| 3,618,741 | 11/1971 | Berndt | 414/746.4 |
| 3,913,751 | 10/1975 | Friedman | 414/746.4 |
| 4,051,775 | 10/1977 | Watson | 414/746.4 |
| 4,193,486 | 3/1980 | Borzym et al. | 414/746.4 |
| 4,889,467 | 12/1989 | Zahlaus | 414/746.4 |

FOREIGN PATENT DOCUMENTS

| | | | |
|---|---|---|---|
| 0 129 180 | 12/1984 | European Pat. Off. | |
| 414061 | 1/1994 | European Pat. Off. | |
| 1316672 | 12/1962 | France | 414/746.4 |
| 1348597 | 12/1963 | France | 414/746.4 |
| 37224 | 12/1968 | Germany | 414/746.4 |
| 22276 | 2/1977 | Japan | 414/746.4 |
| 37376 | 3/1977 | Japan | 414/746.4 |
| 91267 | 8/1978 | Japan | 414/746.4 |
| 291324 | 12/1986 | Japan | 414/746.4 |
| 132933 | 1/1960 | U.S.S.R. | 414/746.4 |
| 1199724 | 12/1985 | U.S.S.R. | 414/746.4 |
| 1335403 | 9/1987 | U.S.S.R. | 414/746.4 |
| 1355442 | 11/1987 | U.S.S.R. | 414/746.4 |

*Primary Examiner*—Karen M. Young
*Assistant Examiner*—Douglas Hess
*Attorney, Agent, or Firm*—Pillsbury Madison & Sutro LLP

[57] ABSTRACT

The present invention is a device for picking out individual rods from an unordered bundle independent of the position of the rods in the bundle and their positions relative to each other. The device makes it possible to handle the rods and the picking out process without displacing the objects along their length. When an object shall be picked out and transferred to the receiving level 15, a lifting device 19 is moved up through the objects which are present in the intermediate storage. At the front end of the lifting device 19 there is a V-shaped recess 20. The object so picked up is lifted over to the receiving level 15 thereby that a conveyor 21 is activated. The conveyor extends along the whole length of the intermediate storage and the receiving level and it carries several supporting wheels 23.

3 Claims, 3 Drawing Sheets

SEPARATING AND PICKING OUT DEVICE

The present invention is directed to a device for separating one individual elongated object from a bundle. The device is primarily intended to be used for picking up tubes and rods at working machinery.

Elongated objects are typically delivered from the manufacturer in the form of bundles, each with a great number of individual objects. In the case of steel rods or tubes of small dimensions several hundred individual objects may be included in a bundle, the weight of which can be several tons. From these bundles individual objects shall be picked out and moved on for working upon or other activity.

Problems arise at the picking out of individual objects because the objects are not ordered and are lying overlapping and at angles in the bundles. This contributes to making manual picking out a heavy and time-consuming task. Thus, it is desired that the picking out can be done automatically by a machine.

A device for separating a single rod from a bundle of rods is described in EP-414 061. The device includes V-shaped control equipment for the rods, which are taken out from the bottom of this device. Another device for supplying individual objects to an automatic milling machine is known from EP-129 180, according to which the device includes a magazine having several levels of storing at which the rods are horizontally separated.

The present invention is for a device, by means of which individual rods can be picked out from an unordered bundle independant of the position of the rods in the bundle and their positions relative to each other. The device makes it possible to handle the rods and the picking out process without displacing the objects along their length.

The invention will below be described with reference to the enclosed figures.

Figure 1:
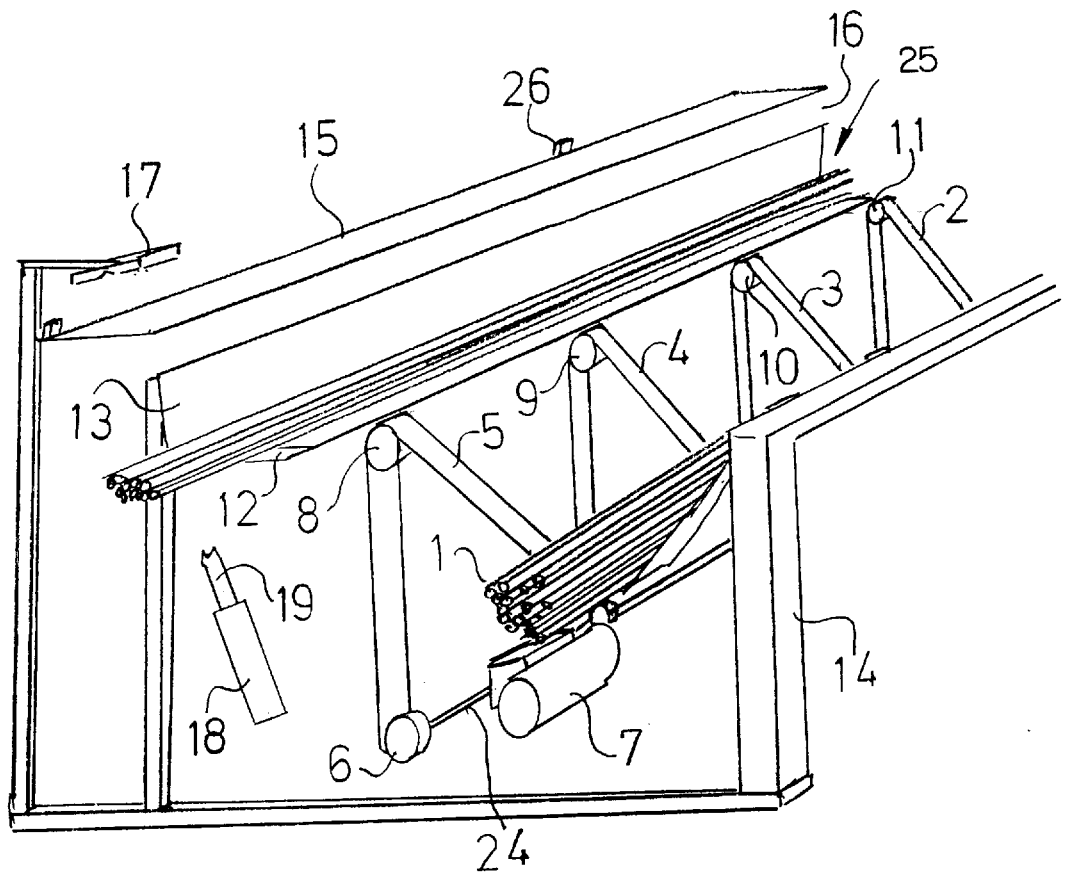
FIG. 1 is a perspective view of a device according to the invention.

The objects which shall be separated are supplied to the device as a bundle 1, which is positioned in a hopper formed by bands 2, 3, 4, 5. The objects for which the device is used are primarily rods and tubes made from steel or plastic which have some flexibility. The diameter or corresponding outer dimension of the objects are mostly 4–25 mm and their length is about 4–6 m. One end of the bands 2, 3, 4, 5 is attached to the stand 14 and extends therefrom via pulley wheels 8, 9, 10, 11 to lower rolls 6, to which the other ends of the bands are attached. The lower rolls 6 are movable and in the embodiment shown in the figure they are mounted onto a common shaft which is driven by a motor 7. Between the upper mountings and the pulley rolls the bands form the main hopper, wherein the objects are placed when they are initially supplied to the device.

The separating of single objects takes place from an intermediate storage 25 at a flat, somewhat inclined board 12 having an adjacent supporting surface 13. The objects are transferred from the main hopper to the intermediate storage so that the bands are rolled onto the lower rolls 6. The bundle 1 in the main hopper is then lifted and when it reaches above the bands on the pulley rolls a small quantity of the objects in the main hopper slip or roll over to the intermediate storage. The winding up of the bands takes place in a controlled way, for example in small steps until the intermediate magazine has been filled up to a desired extent. In order to monitor this a sensor can be built into the board 12 and give signal to the control equipment for the motor 7 depending upon if the sensor indicates presence or non presence of the objects.

From the intermediate storage 25 on the board 12 individual objects are picked out and moved over to a receiving level 15, also preferably having the shape of a flat board. In the embodiment of the invention, which is shown in the figure, this board is somewhat inclined and approximately parallel with the board 12 of the intermediate storage. The picked out object slips or rolls down to stop jaws 26 or the like. These are movably arranged and when the object shall be moved further on the stop jaws are moved away and the object can slip or roll down onto a conveyor which is arranged adjacent to the receiving level.

Figure 2:
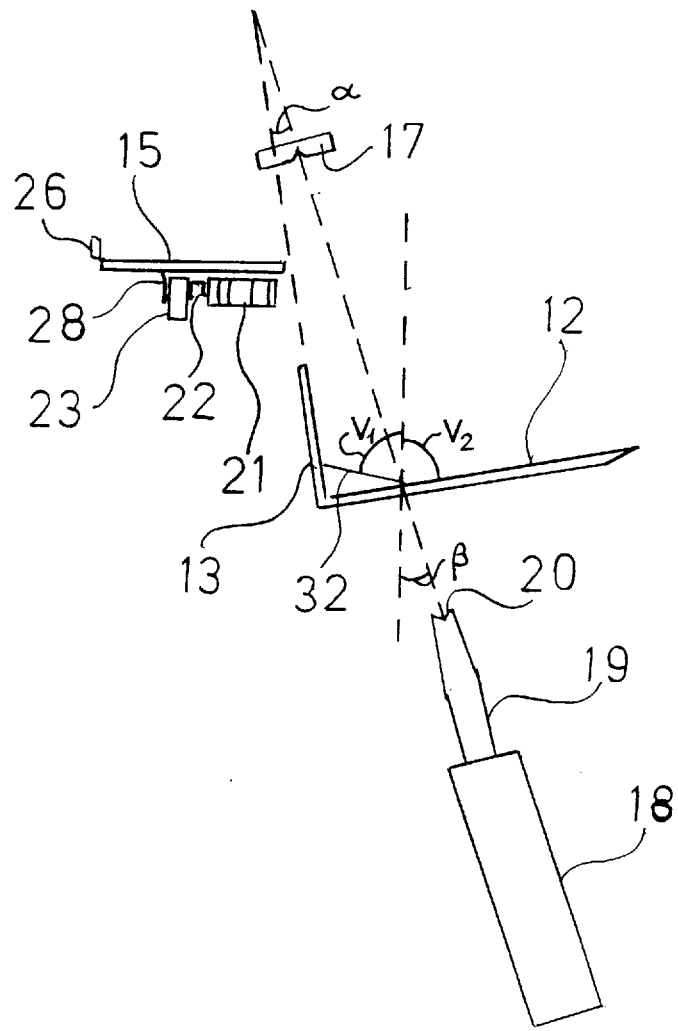
FIG. 2 shows the device of the invention in a side view.
Figure 3:
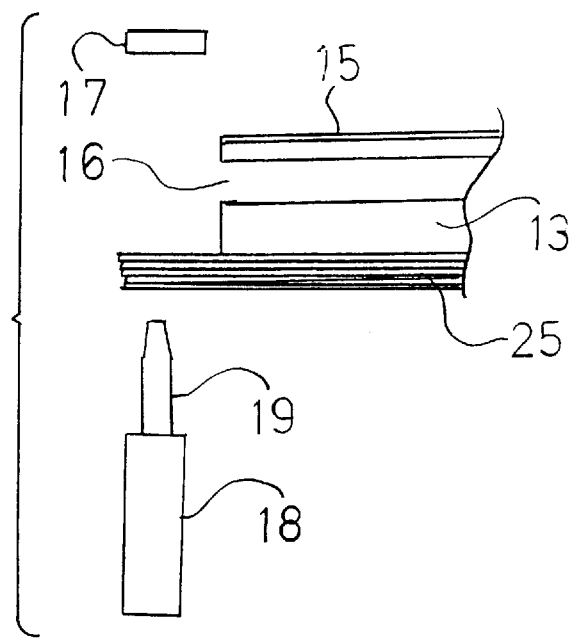
FIG. 3 is a side view of the device at right angle to that of FIG. 2.
Figure 4:
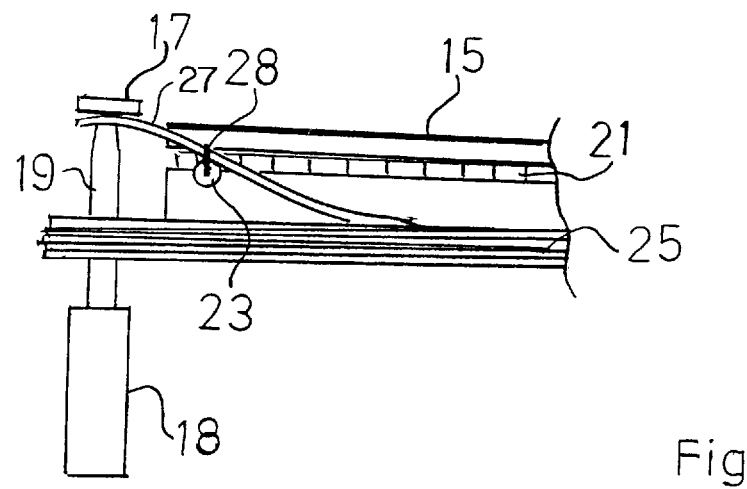
FIG. 4 shows a part of the device of FIG. 1 during the process of picking out an object.

The design and function of the device is shown more in detail in FIG. 2. When an object shall be picked out and transferred to the receiving level 15, a lifting device 19 is moved up through the objects which are present in the intermediate storage. The movement is achieved by means of a pneumatic or hydraulic cylinder 18, and the lifting device 19 can be consituted by or mounted directly onto the plunger of the cylinder. At the front end of the lifting device 19 there is a V-shaped recess 20. Preferably at least this part of the lifting device is made easily exchangeable, so that it can be adapted to the dimension and shape of the objects which are being handled in the device. When the lifting device passes the objects of the board 12 of the intermediate storage, one end of a single object is lifted up to a dolly 17, which is positioned a little higher than the receiving level 15 and is pushed thereto by the lifting device.

The object so picked up is lifted over to the receiving level 15 so that a conveyor 21 is activated. The conveyor extends along the whole length of the intermediate storage and the receiving level and it carries several supports, preferably supporting wheels or rolls 23, distributed along a little less than half of the length of the conveyor. The distance between the supporting wheels in most applications is about 1 m. When the conveyor is inactive, it does not move and all wheels are concealed under the level 15, as shown in FIG. 2. When activated the conveyor makes a movement which corresponds to one round and after the movement has been completed the supporting wheels return to the starting positions. The supporting wheels are each carried by a holder 22, which then pass through the slit 16 between the supporting surface 13 and the receiving level 15. The picked out object is then lifted up to the level of the receiving level, and when the lifting device is lowered at a position when the object is carried by the supporting wheels the object will slip or roll over to the receiving level.

Figure 5:
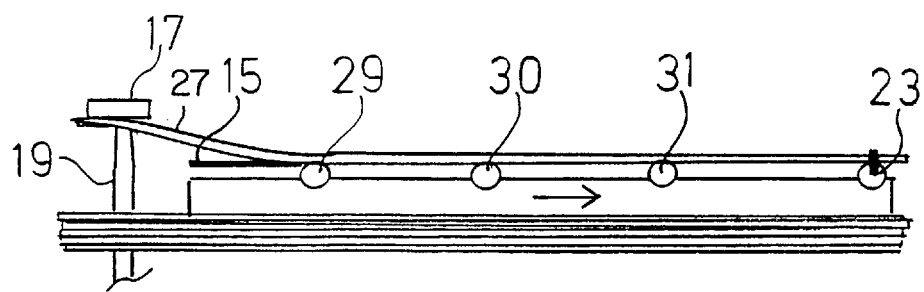
FIG. 5 shows a part of the device in one instance of the working cycle of the device.

The position immediately before the lifting device is being lowered is shown in FIG. 5. One object 27, in this example a round steel bar, is lifted at one of its ends by a lifting device and is carried by the supporting wheels 23, 29, 30, 31 which are mounted onto the conveyor to move in the direction which is shown by an arrow (to the right in the figure). The holder for the first supporting wheel 23 also carries a pin 28 to ensure catching of the object 27.

The board 12 of the intermediate storage and its supporting surface 13 preferably are positioned at a right angle to each other. Closest to the supporting surface 13 the board 12 has an upbent edge 32 which connects to the supporting surface 13. Both the board 12 and the edge 32 form acute angles $v_1$ and $v_2$, respectively, to a vertical line and the angles may be of different size. Preferably the board 12 and the edge 32 meet along a line, the extension of which hits a line at a right angle thereto, along which the lifting device 20 performs its movement. The line of movement of the lifting device is essentially vertical but forms an acute angle $\alpha$ with a level of the supporting surface 13 and thus also an acute angle $\beta$ with a vertical line. In other embodiments of the invention the direction of movement may coincide with the vertical line, i.e. the angle $\beta=0$. The position of the lifting device can be so adjusted that the angle $\alpha$ is adapted to the dimensions of the objects handled. Preferably the lifting device makes its movement along a line which is at some distance from the plane of the supporting level 13, so that their is no risk that further objects which may partly follow along in the lifting movement are clamped against the supporting surface. By the inclination of the board 12 and the edge 32 it is secured that there are objects accessible for lifting all the time until the last object has been taken from the intermediate storage.

I claim:

1. A device for picking out individual objects from an unordered bundle of elongated objects, said device comprising:

a lifting device constructed and arranged to lift one end of an elongated object from the bundle of elongated objects to a level above the bundle of elongated objects; and supports constructed and arranged to engage an underside of the elongated object proximate the end thereof that has been lifted by said lifting device and to move along the length of the elongated object toward an opposite end thereof while maintaining a position above the bundle of elongated objects to progressively lift the remainder of the elongated object to a level above the bunch of elongated objects.

2. The device according to claim 1, further comprising a dolly against which the object which has been selected and lifted by the lifting device is being clamped.

3. The device according to claim 1 or 2, wherein a direction of movement of the lifting device forms an acute angle ($\beta$) with a vertical line.

* * * * *